(12) United States Patent
Kita et al.

(10) Patent No.: US 10,668,712 B2
(45) Date of Patent: Jun. 2, 2020

(54) PRINTING DEVICE HAVING ENGAGEMENT PORTION FOR SUPPRESSING DISENGAGEMENT OF BEARING FROM HOLDER

(71) Applicant: BROTHER KOGYO KABUSHIKI KAISHA, Nagoya, Aichi (JP)

(72) Inventors: Hiroaki Kita, Nagoya (JP); Yusuke Ikemoto, Nagoya (JP); Hikaru Nagata, Okazaki (JP); Yuichiro Suzuki, Komaki (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 447 days.

(21) Appl. No.: 15/702,863

(22) Filed: Sep. 13, 2017

(65) Prior Publication Data

US 2018/0117899 A1 May 3, 2018

(30) Foreign Application Priority Data

Oct. 28, 2016 (JP) ................................ 2016-211262

(51) Int. Cl.
| | | |
|---|---|---|
| *B41J 11/04* | (2006.01) | |
| *B41F 1/38* | (2006.01) | |
| *B41J 2/32* | (2006.01) | |
| *B41F 13/20* | (2006.01) | |
| *B41J 29/02* | (2006.01) | |
| *F16B 2/20* | (2006.01) | |

(52) U.S. Cl.
CPC ................ *B41F 1/38* (2013.01); *B41J 2/32* (2013.01); *B41F 13/20* (2013.01); *B41J 11/04* (2013.01); *B41J 29/02* (2013.01); *F16B 2/20* (2013.01)

(58) Field of Classification Search
None
See application file for complete search history.

(56) References Cited

U.S. PATENT DOCUMENTS

| | | | | |
|---|---|---|---|---|
| 9,848,692 B1 * | 12/2017 | Kato | ........................ | A45F 5/021 |
| 10,000,079 B2 * | 6/2018 | Ikemoto | ................... | B41J 11/04 |
| 10,131,159 B2 * | 11/2018 | Inaba | ........................ | B41J 29/02 |

(Continued)

FOREIGN PATENT DOCUMENTS

| | | |
|---|---|---|
| JP | 2015-160427 A | 9/2015 |
| JP | 2015-208920 A | 11/2015 |

*Primary Examiner* — Jill E Culler
(74) *Attorney, Agent, or Firm* — Scully, Scott, Murphy & Presser, PC

(57) ABSTRACT

A printing device includes: a platen roller, a pair of bearings, and a holder. The platen roller has a rotational shaft extending in a first direction. The bearings rotatably support respective end portions of the rotational shaft. Each of the bearings includes an abutment portion. The holder includes a pair of fitting portions into which the bearings is respectively fitted. Each of the fitting portions includes: a receiving portion, an opening portion, and an engagement portion extending from the receiving portion. The receiving portion has an inner space configured to receive the corresponding bearing. The abutment portion is configured to abut against the engagement portion. In a case where an external force in a direction toward the opening portion is applied to the bearing, the engagement portion is configured to be deformed so as to reduce an area of the opening portion, thereby immovably engaging the bearing.

7 Claims, 9 Drawing Sheets

(56) References Cited

U.S. PATENT DOCUMENTS

| | | | | |
|---|---|---|---|---|
| 2003/0058327 A1* | 3/2003 | Louis | ............ | B41J 2/32 |
| | | | | 347/220 |
| 2006/0291933 A1* | 12/2006 | Watanabe | .............. | B41J 11/005 |
| | | | | 400/58 |
| 2010/0053297 A1* | 3/2010 | Yokoyama | ............... | B41J 11/04 |
| | | | | 347/220 |
| 2017/0129260 A1* | 5/2017 | Nakamori | ................. | B41J 2/32 |

\* cited by examiner

US 10,668,712 B2

PRINTING DEVICE HAVING ENGAGEMENT PORTION FOR SUPPRESSING DISENGAGEMENT OF BEARING FROM HOLDER

CROSS REFERENCE TO RELATED APPLICATION

This application claims priority from Japanese Patent Application No. 2016-211262 filed Oct. 28, 2016. The entire content of the priority application is incorporated herein by reference.

TECHNICAL FIELD

The present disclosure relates to a printing device.

BACKGROUND

Portable printing devices are known in the art. Japanese Patent Application Publication No. 2015-160427 discloses a printing device provided with a belt clip. By attaching the printing device to a user's waist belt with the belt clip, the user can use the printing device portably. To this printing device, a structure disclosed in Japanese Patent application Publication No. 2015-208920 may be applicable. The printing device described in Japanese Patent application Publication No. 2015-208920 includes a rear cover supported to be opened and closed. The rear cover includes support sleeves (corresponding to bearings) for rotatably supporting both ends of a rotational shaft of a platen roller. The support sleeves may be presumably fitted with a holder, and the holder may be presumably fixed to the rear cover with a screw.

SUMMARY

However, during attachment or detachment of the printing device to and from the waist belt with the belt clip, the user may accidentally drop the printing device. Depending on the height from which the printing device is dropped, the support sleeves may be disengaged from the holder due to impact of dropping the printing device.

In view of the foregoing, it is an object of the disclosure to provide a printing device capable of suppressing disengagement of bearings from a holder even if an external force is applied to the printing device.

In order to attain the above and other objects, the disclosure provides a printing device including: a platen roller, a pair of bearings, and a holder. The platen roller has a rotational shaft extending in a first direction. The rotational shaft has end portions in the first direction. The pair of bearings each rotatably supports each end portion of the rotational shaft in the first direction. Each of the pair of bearings is formed with a through-hole through which the rotational shaft extends to form a generally hollow cylindrical shape. The through-hole defines a center axis extending in the first direction. Each of the pair of bearings has a generally D-shape as viewed in the first direction. Each of the pair of bearings includes an abutment portion at a part of an outer peripheral surface. The holder includes a pair of fitting portions. Each of the pair of bearings is fitted into each of the pair of fitting portions. Each of the pair of fitting portions includes: a receiving portion, an opening portion, and an engagement portion. The receiving portion has a substantially U-shape as viewed in the first direction. The receiving portion has an inner space configured to receive the corresponding bearing such that the outer peripheral surface of the bearing is fitted into the receiving portion. The opening portion is in communication with the inner space of the receiving portion. The engagement portion extends from the receiving portion to define a gap serving as the opening portion. The abutment portion is configured to abut against the engagement portion. The engagement portion is configured to be deformed so as to reduce an area of the opening portion in response to application of a pressing force from the abutment portion to the engagement portion due to application of an external force to the corresponding bearing in a direction toward the opening portion, whereby the engagement portion immovably engages the corresponding bearing.

BRIEF DESCRIPTION OF THE DRAWINGS

The particular features and advantages of the embodiment(s) as well as other objects will become apparent from the following description taken in connection with the accompanying drawings, in which.

DETAILED DESCRIPTION

[Printing Device 1]

A printing device 1 according to one embodiment of the present disclosure will be described with reference to FIGS. 1 through 7.

The printing device 1 is a thermal printer that can print an image on a printing medium such as a heat sensitive paper.

The printing device 1 may be battery powered. The printing device 1 can be attached to a user's waist belt with a belt clip (not illustrated), thereby enabling the user to carry the printing device 1 while working. The printing device 1 can be connected to an external device (not illustrated) using a USB (registered trademark) cable. The printing device 1 can print characters such as letters and graphic symbols on the print medium on a basis of print data received from the external device. The external device is a common personal computer (PC).

In the following description, a lower-right side, an upper-left side, an upper-right side, a lower-left side, an upper side and a lower side in FIG. 1 will be respectively defined as the right side, the left side, the rear side, the front side, the upper side and the lower side of the printing device 1, respectively.

Figure 1:
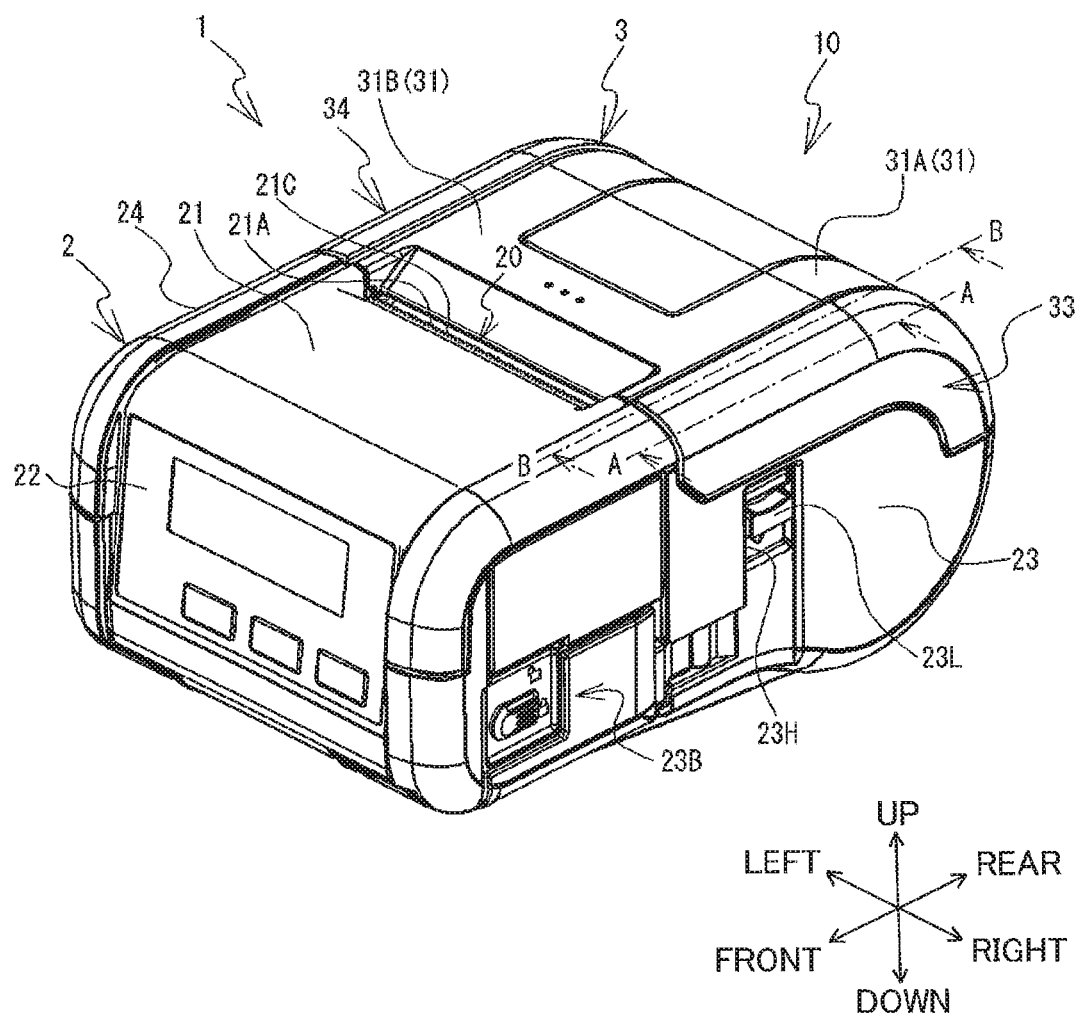
FIG. 1 is a perspective view of a printing device 1 according to one embodiment, and illustrating a state where a second cover 3 is at its closed position.
Figure 2:
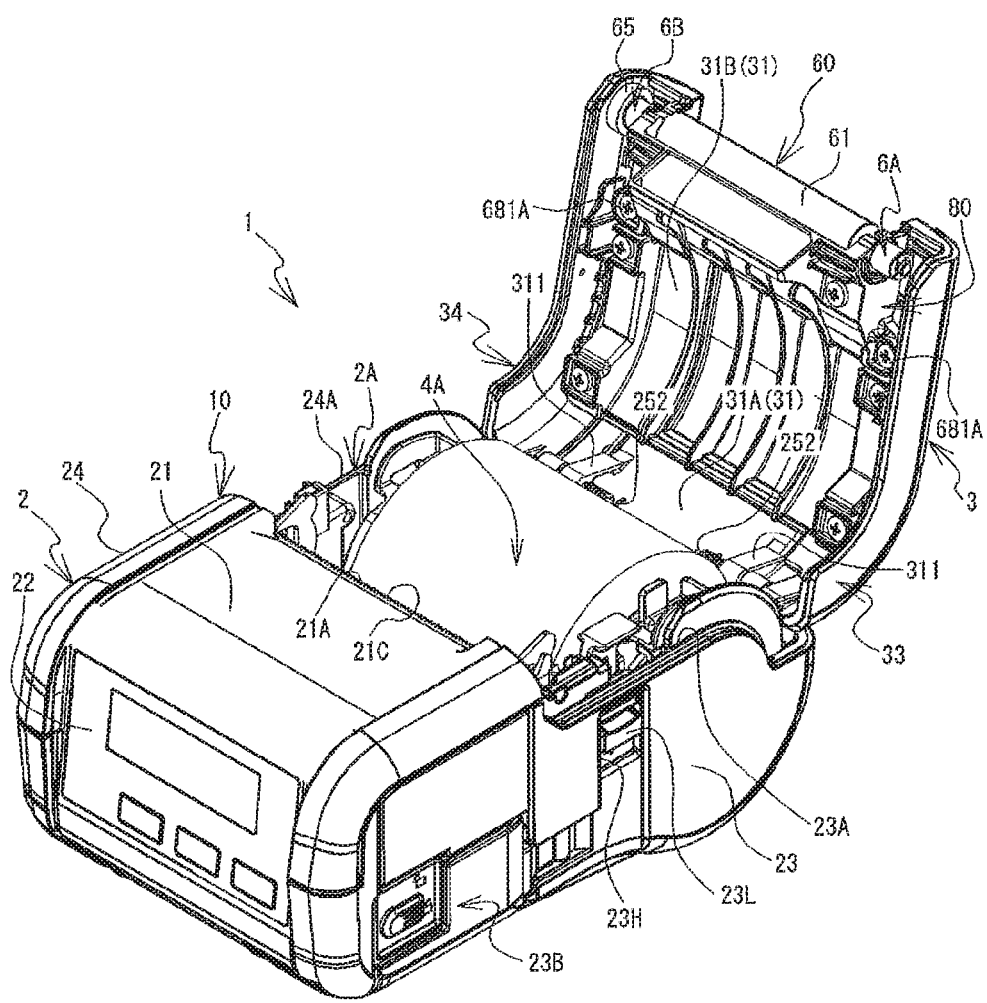
FIG. 2 is a perspective view of the printing device 1 according to the embodiment, and illustrating a state where the second cover 3 is at its open position.
Figure 2:
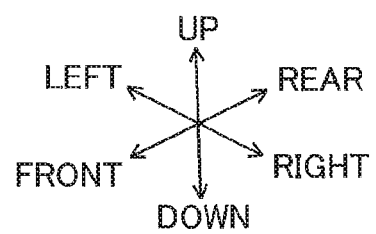
Figure 3:
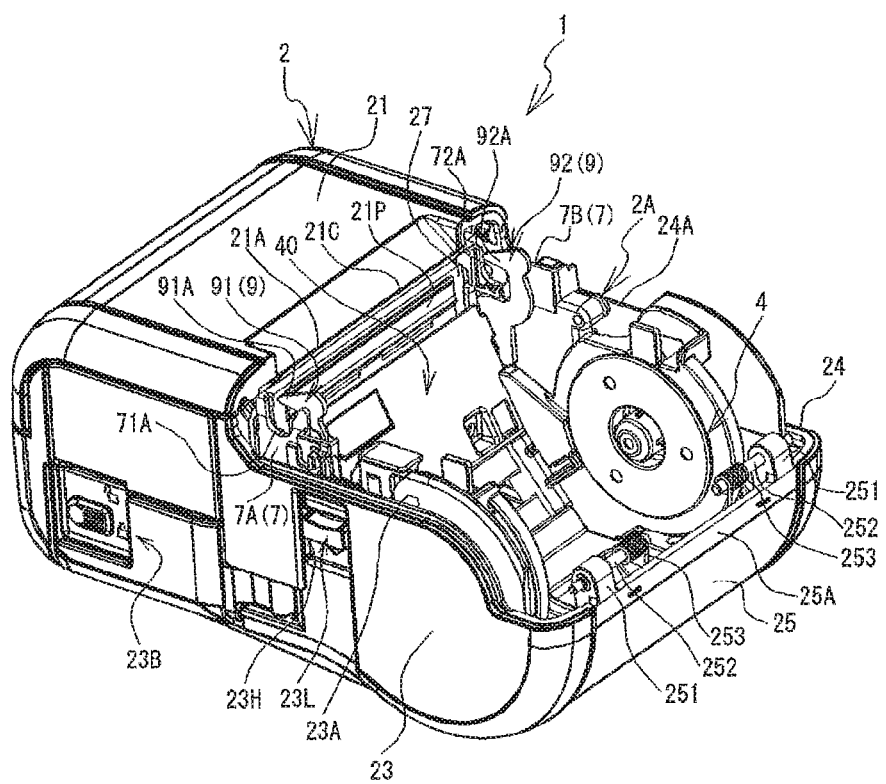
FIG. 3 is a perspective view of the printing device 1 according to the embodiment in which the second cover 3 is omitted.
Figure 3:
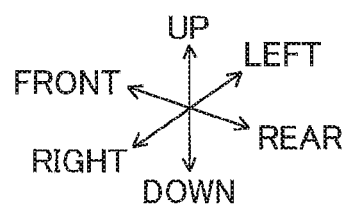

As illustrated in FIGS. 1 through 3, the printing device 1 includes a housing 10. The housing 10 has a general box-like rectangular parallelepiped shape that is elongated in a frontward/rearward direction. The housing 10 includes a first cover 2 and a second cover 3.

[First Cover 2]

The first cover 2 has a box-like shape and includes a front wall 22, a right wall 23, a left wall 24, a rear wall 25 (see FIG. 3), a lower wall 26 (see FIG. 4) and a front-side upper wall 21. The front-side upper wall 21 constitutes a frontward portion of an upper wall of the housing 10. That is, the front-side upper wall 21 is positioned frontward relative to an approximate front-rear center of the upper wall of the housing 10. The right wall 23 is formed with a lever hole 23H and is provided with a battery retaining portion 23B. The lever hole 23H is a through-hole having a rectangular shape and is elongated in an upward/downward direction. A lever 23L protrudes rightward through the lever hole 23H, and is movable in the upward/downward direction within the lever hole 23H. The lever 23L is adapted to switch locking and unlocking of the second cover 3 described later. The battery retaining portion 23B is adapted to accommodate a battery as a power source of the printing device 1 and to retain the battery accommodated therein.

A main chassis (not illustrated) is disposed beneath a rear edge portion 21A of the front-side upper wall 21. The main chassis supports a motor and the like (not illustrated). The main chassis also supports the lever 23L so that the lever 23L is movable in the upward/downward direction. As illustrated in FIG. 3, the main chassis includes an inner wall portion 27 extending downward from the rear edge portion 21A of the front-side upper wall 21. The inner wall portion 27 includes a cutting blade 21C extending along the bottom of the rear edge portion 21A. The cutting blade 21C is configured to cut off a portion of the printing medium that has been printed. A thermal head 21P is disposed at a position below the cutting blade 21C. The thermal head 21P is adapted to print characters on the printing medium by applying heat to the printing medium. The main chassis further includes a pair of support portions 7. Specifically, the pair of support portions 7 includes a support portion 7A extending rearward from a right end portion of the inner wall portion 27, and a support portion 7B extending rearward from a left end portion of the inner wall portion 27. The support portion 7 is adapted to support a restriction mechanism 9 described later. Details of the support portion 7 will be described later.

The rear wall 25 has an upper edge portion 25A. Two support portions 251 protruding upward relative to the upper edge portion 25A are disposed at the rear wall 25. One of the support portions 251 extends upward from a portion adjacent to a right end portion of the upper edge portion 25A, and the remaining one of the support portions 251 extends upward from a portion adjacent to a left end portion of the upper edge portion 25A. Each support portion 251 supports a shaft portion 252 extending in a leftward/rightward direction (an example of a first direction). Each shaft portion 252 extends inward from the corresponding support portion 251. A spring 253 is disposed over each shaft portion 252.

The right wall 23 has an upper edge portion 23A, and the left wall 24 has an upper edge portion 24A. The rear edge portion 21A of the front-side upper wall 21, the upper edge portion 23A of the right wall 23, the upper edge portion 24A of the left wall 24, and the upper edge portion 25A of the rear wall 25 define an opening portion 2A. The opening portion 2A has a generally rectangular shape as viewed from above. The opening portion 2A opens an accommodating portion 40 inside the first cover 2. A roll holder 4 is accommodated in and fixed to the accommodating portion 40. The roll holder 4 is adapted to rotatably support both end portions in the leftward/rightward direction of a roll 4A (see FIG. 2) which is a roll of a printing medium.

[Restriction Mechanism 9]

The restriction mechanism 9 includes a restriction member 91, a restriction member 92, and a connection member (not illustrated). Each of the restriction members 91 and 92 has a plate-like shape. Each side surface of each of the restriction members 91 and 92 faces leftward or rightward. The restriction member 91 is positioned near the right end portion of the inner wall portion 27, and the restriction member 92 is positioned near the left end portion of the inner wall portion 27. The restriction members 91 and 92 are spaces apart from each other in the leftward/rightward direction. A protruding portion 91A is disposed at an upper end portion of the restriction member 91, and protrudes frontward therefrom. A protruding portion 92A is disposed at an upper end portion of the restriction member 92, and protrudes frontward therefrom. The restriction members 91 and 92 are coupled to each other with a coupling portion (not illustrated) provided at respective lower ends of the restriction members 91 and 92.

Figure 4:
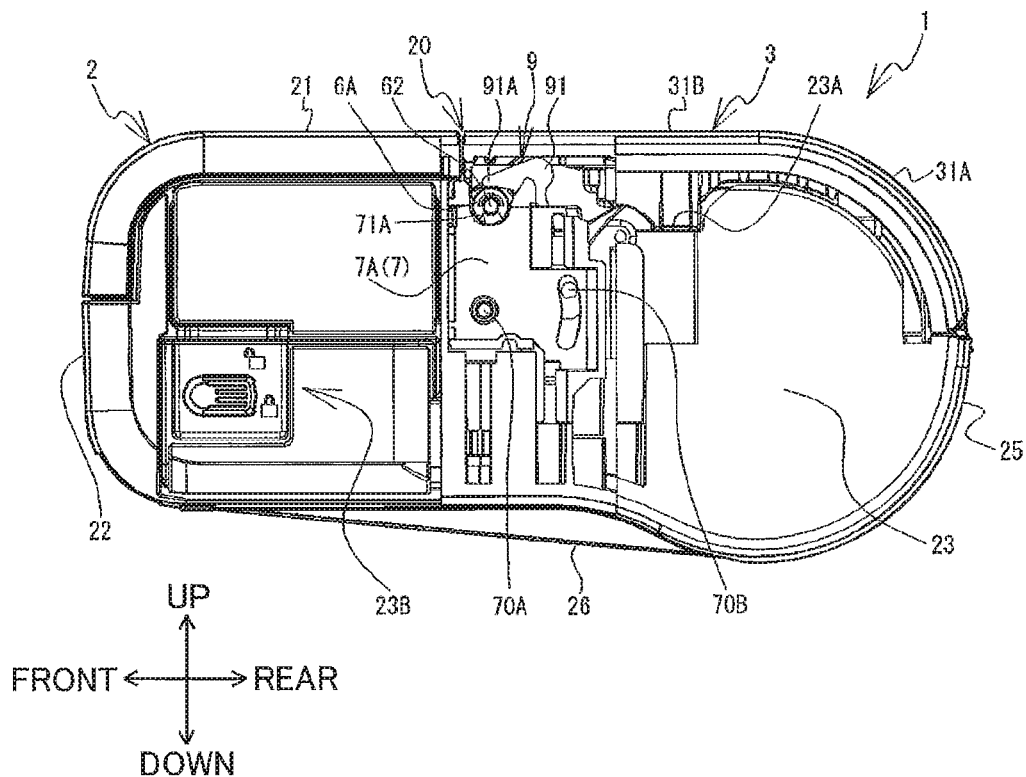
FIG. 4 is a cross-sectional view taken along the line A-A in FIG. 1 as viewed in a direction shown by an arrow.

As illustrated in FIG. 4, the support portion 7A has a shaft portion 70A extending in the leftward/rightward direction. The connection member (not illustrated) and a lower portion of the restriction member 91 are pivotally movably supported to the shaft portion 70A. The connection member is disposed between the restriction member 91 and the lever 23L (see FIG. 1) in the leftward/rightward direction. The connection member includes a shaft portion 70B that protrudes in the leftward/rightward direction. A portion of the shaft portion 70B that protrudes leftward from the connection member is inserted through a hole (not illustrated) formed at a rear end portion of the restriction member 91. A portion of the shaft portion 70B that protrudes rightward from the connection member is inserted through a recessed portion (not illustrated) formed in the lever 23L. Thus, the connection member connects the lever 23L to the restriction member 91. The shaft portion 70B is moved in the upward/downward direction in accordance with an operation of the lever 23L. The restriction member 91 is pivotally moved about the shaft portion 70A in accordance with the upward/downward movement of the shaft portion 70B. Incidentally, in accordance with the pivotal movement of the restriction member 91, the restriction member 92 connected to the restriction member 91 through the coupling portion is also pivotally moved in the same direction as the restriction member 91. The restriction members 91 and 92 are urged in a counter-clockwise direction as viewed from the right side by a spring (not illustrated) provided at the connection member.

In the following description, a pivotally moving direction (clockwise direction and counter-clockwise direction) is denoted as a pivoting direction of a member as viewed from a right side thereof, unless otherwise noted. Hereinafter, a state in which the restriction members 91 and 92 are pivotally moved in the counter-clockwise direction by the biasing force of the spring (see FIGS. 3 and 4) will be referred to as its "restricting state". On the other hand, a state in which the restriction members 91 and 92 are pivotally moved in a clockwise direction against the biasing force of the spring will be referred to as its "non-restricting state".

When the lever 23L is moved upward, the restriction members 91 and 92 are pivotally moved in the counter-clockwise direction to move the protruding portions 91A and 92A frontward, respectively. In a state where the lever 23L is positioned at its uppermost position, the restriction members 91 and 92 are in the restricting state. In the restricting state as illustrated in FIG. 3, the protruding portion 91A is positioned above a recessed portion 71A formed at an upper edge of the support portion 7A, and the protruding portion 92A is positioned above a recessed portion 72A formed at an upper edge of the support portion 7B. When the lever 23L is moved downward, the restriction members 91 and 92 are pivotally moved in the clockwise direction to move the protruding portions 91A and 92A rearward, respectively. In a state where the lever 23L is positioned at its lowermost position, the restriction members 91 and 92 are in the non-restricting state. In the non-restricting state, the protruding portion 91A is positioned rearward relative to the recessed portion 71A of the support portion 7A, and the protruding portion 92A is positioned rearward relative to the recessed portion 72A of the support portion 7B.

[Second Cover 3]

The second cover 3 is movable between a closed position closing the opening portion 2A (see FIG. 2) from above as illustrated in FIG. 1 and an open position opening the opening portion 2A as illustrated in FIG. 2. In the following description, directions relating to the printing device 1 will also be applied to the second cover 3, under an assumption that the second cover 3 is in the closed position. The second cover 3 constitutes a rearward portion of the upper wall of the housing 10. That is, the second cover 3 is positioned rearward relative to the approximate front-rear center of the upper wall of the housing 10.

As illustrated in FIG. 2, the second cover 3 includes a lid plate portion 31, and side plate portions 33 and 34. The lid plate portion 31 includes a first portion 31A and a second portion 31B. The first portion 31A is a curved shaped, and the second portion 31B is a flat shaped. The first portion 31A has protruding portions 311 formed on a rear edge of the first portion 31A. Each protruding portion 311 includes a hole in which each of the two shaft portions 252 of the first cover 2 is inserted. The second portion 31B extends frontward form a front edge of the first portion 31A. The side plate portion 33 is connected to a right edge of the lid plate portion 31 and curves while extending downward. The side plate portion 34 is connected to a left edge of the lid plate portion 31 and curves while extending downward.

[Holder 80]

Figure 5:
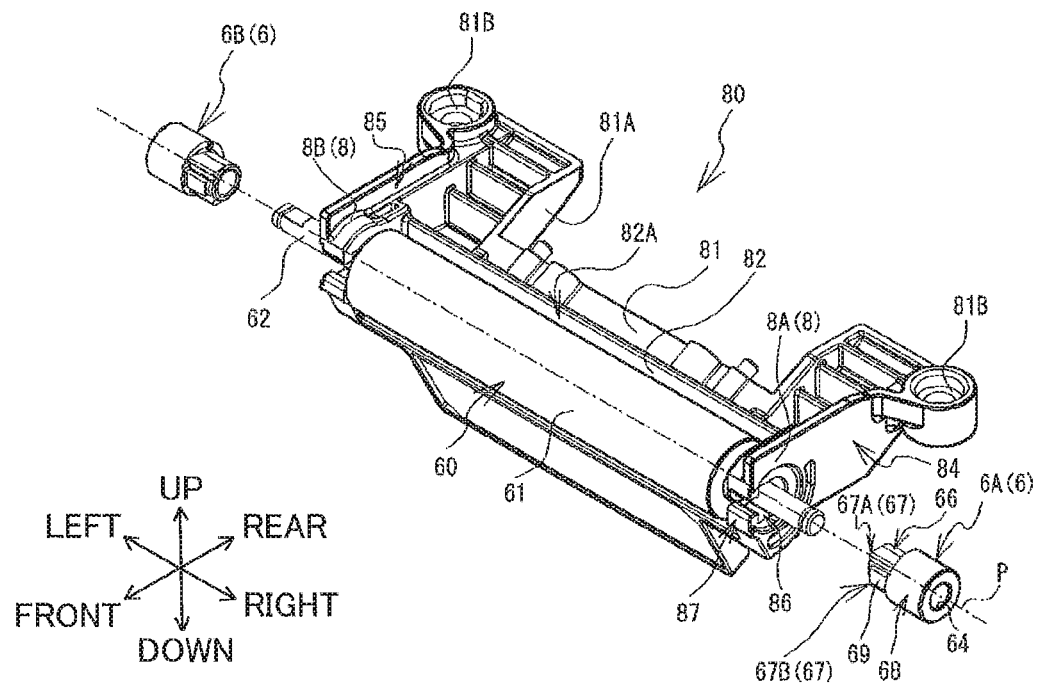
FIG. 5 is an exploded perspective view of a platen roller 60, a holder 80 and a bearing 6 in the printing device 1 according to the embodiment.

A holder 80 is provided at a position near a front end portion of an inner wall of the second portion 31B of the second cover 3. The holder 80 is adapted to support a platen roller 60 described later. As illustrated in FIG. 5, the holder 80 has a symmetrical shape in the leftward/rightward direction. The holder 80 includes a first portion 81, a second portion 82, a right wall portion 84, and a left wall portion 85.

The first portion 81 has a generally rectangular shape elongated in the leftward/rightward direction as viewed from above. The first portion 81 has a recessed portion 81A recessed frontward from a rear end portion of the first portion 81. The rear end portion of the first portion 81 has ends in the leftward/rightward direction, and a through-hole 81B is formed at each end in the leftward/rightward direction. The through-holes 81B penetrate the left end and right end of the first portion 81 in the upward/downward direction, respectively. The second portion 82 is positioned at a front end portion of the first portion 81, and has a curved shape in conformance with a shape of a platen 61 described later. Thus, the second portion 82 has a front portion providing a platen receiving portion 82A which is a space for positioning the platen 61. The right wall portion 84 is connected to a right end of the first portion 81 and a right end of the second portion 82. The right wall portion 84 has a generally rectangular shape elongated in the frontward/rearward direction as viewed from the right side. The right wall portion 84 extends to a position frontward of the second portion 82. Therefore, a portion of the right wall portion 84 covers the platen receiving portion 82A from its right side. The left wall portion 85 is connected to a left end of the first portion 81 and a left end of the second portion 82. The left wall portion 85 has a generally rectangular shape elongated in the frontward/rearward direction as viewed from the left side. The left wall portion 85 extends to a position frontward of the second portion 82. Therefore, a portion of the left wall portion 85 covers the platen receiving portion 82A from its left side.

In the following description, the portion of the right wall portion 84 covering the platen receiving portion 82A from the right side will be referred to as a "fitting portion 8A", and the portion of the left wall portion 85 covering the platen receiving portion 82A from the left side will be referred to as a "fitting portion 8B". Further, the fitting portion 8A and the fitting portion 8B will be collectively referred to as a "fitting portion 8".

[Fitting Portion 8]

The fitting portions 8A and 8B oppose each other in the leftward/rightward direction, and have symmetrical shapes as each other in the leftward/rightward direction. In the following description, only the fitting portion 8A will be described while omitting the description of the fitting portion 8B. The terms and reference numerals of each component of the fitting portion 8A are also applicable to those of the component of the fitting portion 8B.

Figure 6:
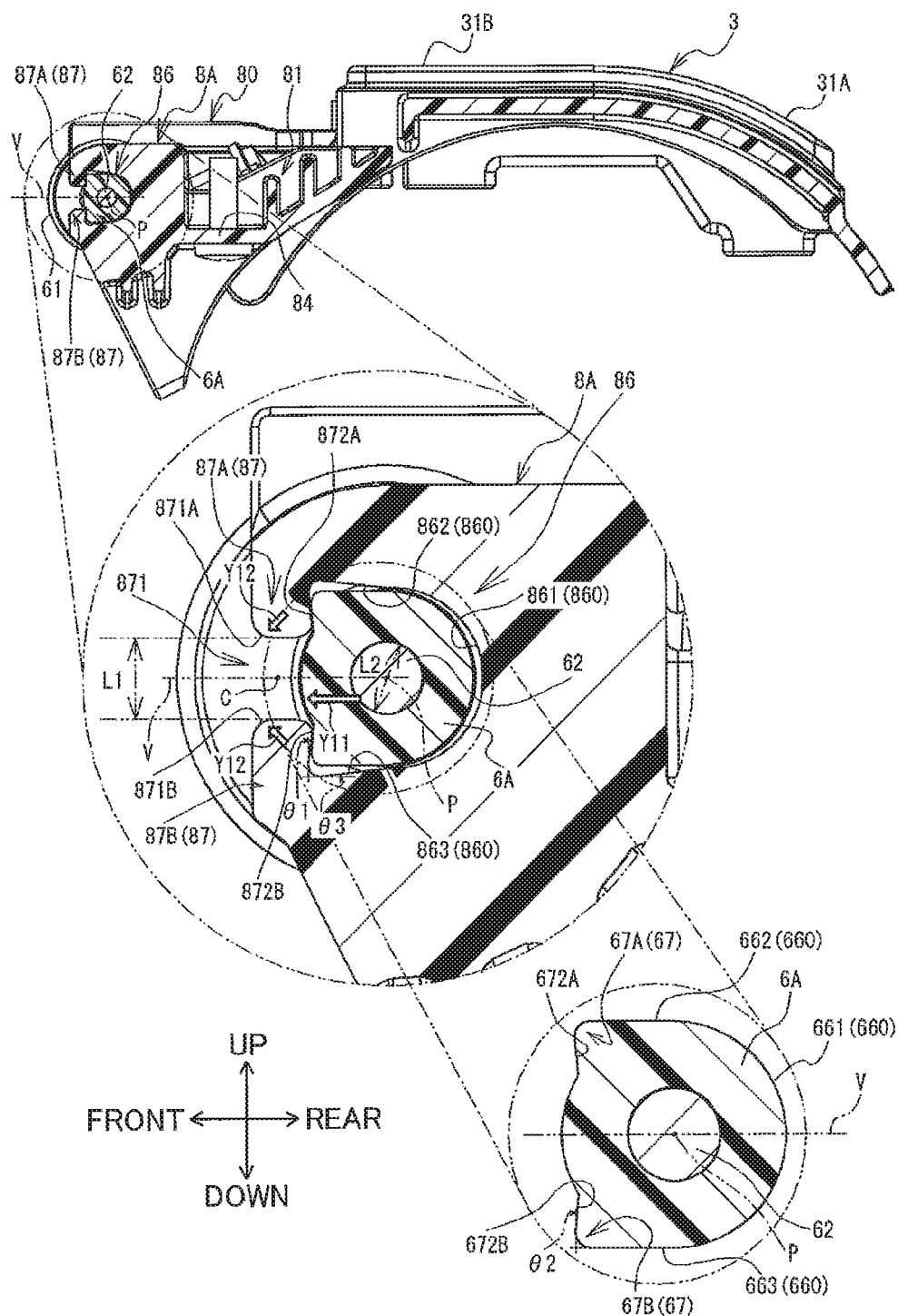
FIG. 6 illustrates a cross-sectional view taken along a line B-B in FIG. 1 as viewed in a direction shown by an arrow, and illustrating a partial enlarged view of a portion of the cross-sectional view.

As illustrated in FIG. 6, the fitting portion 8A includes a receiving portion 86, and a pair of engagement portions 87 (engagement portions 87A and 87B). The receiving portion 86 is a wall portion having a predetermined length in the leftward/rightward direction. The receiving portion 86 is generally U-shaped as viewed in the leftward/rightward direction. Specifically, the receiving portion 86 has a generally U-shape rotated by 90 degrees in the counter-clockwise direction as viewed from the right side. The receiving portion 86 has an inner wall surface 860 that defines a recessed portion recessed rearward. The inner wall surface 860 includes a curved portion having a semi-circular shape, and two flat portions each extending frontward from each end of the curved portion as viewed from the right side. The curved portion will be referred to as a "first inner wall surface 861", and the two flat portions will be referred to as "second inner wall surfaces 862 and 863", respectively. The second inner wall surface 862 extends frontward while slightly sloping upward from an upper end of the first inner wall surface 861. The second inner wall surface 863 extends frontward while slightly sloping downward from a lower end of the first inner wall surface 861. Each of an angle of the second inner wall surface 862 relative to the frontward/rearward direction, and an angle of the second inner wall surface 863 relative to the frontward/rearward direction as viewed from the right side will be referred to as a "third angle θ3". Incidentally, in FIG. 6, the third angle θ3 of the second inner wall surface 863 relative to the frontward/rearward direction is illustrated while omitting illustration of the third angle θ3 of the second inner wall surface 862 relative to the frontward/rearward direction.

The pair of engagement portions 87 protrudes toward each other from two end portions (front end portions) of the receiving portion 86. Specifically, the engagement portion 87A protrudes downward from an upper front end portion of the receiving portion 86, and the engagement portion 87B protrudes upward from a lower front end portion of the receiving portion 86. A lower end of the engagement portion 87A (hereinafter simply referred to as an "open end 871A") and an upper end of the engagement portion 87B (hereinafter simply referred to as an "open end 871B") are spaced apart from each other and oppose each other in the upward/downward direction. The open ends 871A and 871B form an opening portion 871 communicated with a space defined by the inner wall surface 860 of the receiving portion 86. The space will be referred to as an "inner space of the receiving portion 86". The pair of engagement portions 87 is positioned on opposite sides of the opening portion 871 in the upward/downward direction. In the following description, a gap length between the open ends 871A and 871B, i.e., a gap of the opening portion 871 in the upward/downward direction will be described as a "gap length L". The engagement portions 87A and 87B are examples of a first engagement portion and a second engagement portion.

The engagement portion 87A has a rear wall surface (hereinafter referred to as a "sloped surface 872A") that is slightly sloped rearward toward the open end 871A. The engagement portion 87B has a rear wall surface (hereinafter referred to as a "sloped surface 872B") that is slightly sloped rearward toward the open end 871B. In other words, the sloped surfaces 872A and 872B are sloped toward the inner space of the receiving portion 86 as extending toward the opening portion 871. In the following description, Each of an angle of the sloped surface 872A relative to the upward/downward direction, and an angle of the sloped surface 872B relative to the upward/downward direction as viewed from the right side will be referred to as a "first angle θ1". Incidentally, in FIG. 6, the first angle θ1 of the sloped surface 872B relative to the upward/downward direction is illustrated while omitting illustration of the first angle θ1 of the sloped surface 872A relative to the upward/downward direction.

[Platen Roller 60]

As illustrated in FIG. 5, the platen roller 60 includes the platen 61 and a rotational shaft 62. The platen 61 is a hollow cylindrical member extending in the leftward/rightward direction. The platen 61 has a length in the leftward/rightward direction slightly smaller than a distance between the fitting portions 8A and 8B. The platen 61 is positioned at the platen receiving portion 82A, that is, at a portion covered by the fitting portions 8A and 8B from the right side and the left side, respectively. The platen 61 has a through-hole (not illustrated) that penetrates a diametrical center of the platen 61 in the leftward/rightward direction. The rotational shaft 62 is a solid cylindrical shaft member extending through the through-hole of the platen 61 in the leftward/rightward direction. The rotational shaft 62 has each end portion in the leftward/rightward direction protruding outward from the corresponding end in the leftward/rightward direction of the platen 61. The platen 61 is fixed to the rotational shaft 62 and is rotatable integrally with the rotational shaft 62. The rotational shaft 62 has an outer diameter L2 (see FIG. 6) smaller than the gap length L of the opening portion 871.

[Bearing 6]

As illustrated in FIG. 5, a bearing 6 is provided at each end portion in the leftward/rightward direction of the rotational shaft 62 of the platen roller 60. The bearing 6 includes a bearing 6A and a bearing 6B. The bearing 6A is provided at an end portion of the rotational shaft 62 protruding rightward from the platen 61. The bearing 6B is provided at an end portion of the rotational shaft 62 protruding leftward from the platen 61. With this configuration, the rotational shaft 62 is rotatable relative to the bearings 6A and 6B. The bearings 6A and 6B have symmetrical shape in the leftward/rightward direction. In the following description, only the bearing 6A will be described omitting the description of the bearing 6B. Technical terms and reference numerals of components of the bearing 6A are also applied to those of the components of the bearing 6B.

The bearing 6A is a generally hollow cylindrical member having a through-hole 64 into which the rotational shaft 62 is inserted. The through-hole 64 defines a center axis P that passes through a diametrical center of the through-hole 64. The center axis P extends in the leftward/rightward direction. Further, the center axis P extends through a diametrical center of the platen 61, and a diametrical center of the rotational shaft 62.

The bearing 6A includes a small diameter portion 66 and a large diameter portion 68. The small diameter portion 66 is generally hollow cylindrical and is positioned leftward of the large diameter portion 68. That is, the small diameter portion 66 constitutes a left part of the bearing 6A. A protrusion 69 is provided at a front portion of an outer peripheral surface of the small diameter portion 66. Further, a pair of abutment portions 67 (abutment portions 67A and 67B) is provided at the outer peripheral surface of the small diameter portion 66. The abutment portion 67A is positioned above the protrusion 69, and the abutment portion 67B is positioned below the protrusion 69. The large diameter portion 68 has a generally hollow cylindrical shape and constitutes a right part of the bearing 6A. The large diameter portion 68 has an outer diameter greater than that of the small diameter portion 66. The large diameter portion 68 is connected to a right end of the small diameter portion 66. The abutment portions 67A and 67B are examples of a first abutment portion and a second abutment portion.

As illustrated in FIG. 6, the pair of abutment portions 67 protrudes outward from the outer peripheral surface of the small diameter portion 66 of the bearing 6A. Incidentally, FIG. 6 is a cross-sectional view taken along an imaginary plane which is positioned adjacent to a left end of the small diameter portion 66 in the leftward/rightward direction. The imaginary plane is positioned leftward of the protrusion 69, and therefore, does not pass through the protrusion 69. Thus, the protrusion 69 is not illustrated in FIG. 6. The position adjacent to the left end of the small diameter portion 66 will be referred to as a "specific portion". The abutment portion 67A protrudes outward from a front upper portion of the outer peripheral surface of the small diameter portion 66. The abutment portion 67B protrudes outward from a front lower portion of the outer peripheral surface of the small diameter portion 66. The specific portion of the right bearing 6A has a generally D-shape as viewed in the leftward/rightward direction.

An outer circumferential surface 660 of the specific portion of the bearing 6A has a first outer peripheral surface 661, second outer peripheral surfaces 662 and 663, and sloped surfaces 672A and 672B. The first outer peripheral surface 661 includes two curved portions as viewed from the right side. Specifically, the first outer peripheral surface 661 includes a rear curved portion having a semi-circular shape and positioned rearward relative to an approximate front-rear center of the bearing 6A, and a front curved portion positioned between the abutment portions 67A and 67B. The first outer peripheral surface 661 has a curvature approximately equal to a curvature of the first inner wall surface 861 of the receiving portion 86. Each of the second outer peripheral surfaces 662 and 663 is a flat portion extending frontward from corresponding front end of the rear curved portion of the first outer peripheral surface 661. Specifically, the second outer peripheral surface 662 extends from an upper front end of the rear curved portion of the first outer peripheral surface 661. The second outer peripheral surface 662 has a front portion constituting an upper surface of the abutment portion 67A. The second outer peripheral surface 663 extends from a lower front end of the rear curved portion of the first outer peripheral surface 661. The second outer peripheral surface 663 has a front portion constituting a lower surface of the abutment portion 67B. Each of the second outer peripheral surfaces 662 and 663 extends in a direction approximately parallel to the frontward/rearward direction as viewed from the right side. Therefore, an angle of each of the second outer peripheral surfaces 662 and 663 relative to the frontward/rearward direction is smaller than the third angle θ3 which is the angle of each of the second inner wall surfaces 862 and 863 of the receiving portion 86 relative to the frontward/rearward direction.

The sloped surface 672A extends downward while slightly sloping rearward from a front end of the second outer peripheral surface 662. The sloped surface 672A constitutes a front surface of the abutment portion 67A. The sloped surface 672B extends upward while slightly sloping rearward from a front end of the second outer peripheral surface 663. The sloped surface 672B constitutes a front surface of the abutment portion 67B. In the following description, an angle of each of the sloped surfaces 672A and 672B relative to the upward/downward direction as viewed from the right side will be referred to as a "second angle θ2". Incidentally, only the second angle θ2 of the sloped surface 672B relative to the upward/downward direction is illustrated in FIG. 6, while omitting the second angle θ2 of the sloped surface 672A relative to the upward/downward direction. The second angle θ2 is approximately equal to the first angle θ1 of each of the sloped surfaces 872A and 872B of the pair of engagement portions 87 relative to the upward/downward direction.

[Attachment of Platen Roller 60 to Holder 80]

As illustrated in FIG. 5, the platen roller 60 is attached to the holder 80 from the front side of the holder 80. The right end portion of the rotational shaft 62 is inserted through the opening portion 871 (see FIG. 6) of the fitting portion 8A into the inner space of the receiving portion 86 of the fitting portion 8A. The right end portion of the rotational shaft 62 protrudes rightward from the fitting portion 8A. The left end portion of the rotational shaft 62 is inserted through the opening portion 871 of the fitting portion 8B into the inner space of the receiving portion 86 of the fitting portion 8B. The left end portion of the rotational shaft 62 protrudes leftward from the fitting portion 8B. Incidentally, as illustrated in FIG. 6, the gap length L1 of the opening portion 871 is greater than the outer diameter L2 of the rotational shaft 62. Therefore, through the opening portion 871, each end portion of the rotational shaft 62 can be easily inserted into the corresponding inner space of the receiving portion 86.

As illustrated in FIG. 5, the right end portion of the rotational shaft 62 is inserted through the through-hole 64 of the bearing 6A from the left side. In this way, the bearing 6A is assembled to the right end portion of the rotational shaft 62. Likewise, the left end portion of the rotational shaft 62 is inserted through the through-hole 64 of the bearing 6B from the right side. In this way, the bearing 6B is assembled to the left end portion of the rotational shaft 62. As illustrated in FIG. 6, the outer circumferential surface 660 contacts the inner wall surface 860 of the receiving portion 86, whereby the bearing 6 is fitted with the fitting portion 8. In a state where the bearing 6 is fitted with the fitting portion 8, the bearing 6A and the bearing 6B rotatably support the right and left end portions of the rotational shaft 62, respectively.

The first inner wall surface 861 of the receiving portion 86 and the rear curved portion of the first outer peripheral surface 661 oppose each other in a radial direction of the rotational shaft 62. Because the curvatures of the first inner wall surface 861 and the first outer peripheral surface 661 are approximately equal to each other, the first inner wall surface 861 and the first outer peripheral surface 661 can provide intimate contact therebetween. Further, the second inner wall surface 862 of the receiving portion 86 and the second outer peripheral surface 662 of the bearing 6 oppose each other in the upward/downward direction, and the second inner wall surface 863 of the receiving portion 86 and the second outer peripheral surface 663 of the bearing 6 oppose other in the upward/downward direction. Because the third angle θ3 of each of the second inner wall surfaces 862 and 863 of the receiving portion 86 relative to the frontward/rearward direction is greater than the angle of each of the second outer peripheral surfaces 662 and 663 of the bearing 6 relative to the frontward/rearward direction, gaps are formed between the second inner wall surface 862 and the second outer peripheral surface 662, and between the second inner wall surface 863 and the second outer peripheral surface 663.

The sloped surface 872A of the engagement portion 87A and the sloped surface 672A of the bearing 6 oppose each other in the frontward/rearward direction, and the sloped surface 872B of the engagement portion 87B and the sloped surface 672B of the bearing 6 oppose each other in the frontward/rearward direction. Thus, the pair of engagement portions 87 and the pair of abutment portions 67 are capable of abutting against each other by the abutment between the sloped surface 872A and the sloped surface 672A and by the abutment between the sloped surface 872B and the sloped surface 672B. Because the first angle θ1 of each of the sloped surfaces 872A and 872B relative to the frontward/rearward direction and the second angle θ2 of each of the sloped surfaces 672A and 672B relative to the frontward/rearward direction are approximately equal to each other, intimate contacts can be provided between the sloped surface 872A and the sloped surface 672A, and between the sloped surface 872B and the sloped surface 672B.

In a state where the bearing 6 is fitted with the fitting portion 8, the engagement portion 87A is positioned above the center axis P of the through-hole 64, and the engagement portion 87B is positioned below the center axis P. Similarly, the abutment portion 67A is positioned above the center axis P, and the abutment portion 67B is positioned below the center axis P. Here, an imaginary plane V passing through a center point C in the upward/downward direction of the opening portion 871 and through the center axis P is defined. With this definition, the engagement portions 87A and 87B are positioned symmetrical to each other in the upward/downward direction with respect to the imaginary plane V. Further, the abutment portions 67A and 67B are positioned symmetrical to each other in the upward/downward direction with respect to the imaginary plane V.

As illustrated in FIG. 2, a gear 65 is fixed to the left end portion of the bearing 6B. A thread 681A (see FIG. 2) is threadingly engaged with each through-hole 81B (FIG. 5) from below in a state where the platen roller 60 and the bearing 6 are assembled to the holder 80. Thus, the holder 80 is fixed to the second portion 31B of the second cover 3 by the threads 681A while the platen roller 60 and the bearing 6 are assembled to the holder 80.

[Opening/Closing Operation of Second Cover 3]

As illustrated in FIG. 2, the second cover 3 is supported to the first cover 2 and is pivotally movable about each shaft portion 252 inserted through the hole of each protruding portion 311. The springs 253 (see FIG. 3) mounted on the shaft portions 252 urge the second cover 3 from the closed position (see FIG. 1) toward the open position (see FIG. 2). When the second cover 3 is pivotally moved in the counterclockwise direction against the biasing force of the springs 253, the second cover 3 is moved to the closed position. In the closed position of the second cover 3 illustrated in FIG. 1, the rear edge portion 21A of the first cover 2 is positioned adjacent to a front edge of the second portion 31B of the second cover 3, thereby providing a discharge opening 20 therebetween. The printing medium that has been printed inside the printing device 1 is discharged outside through the discharge opening 20.

Figure 7:
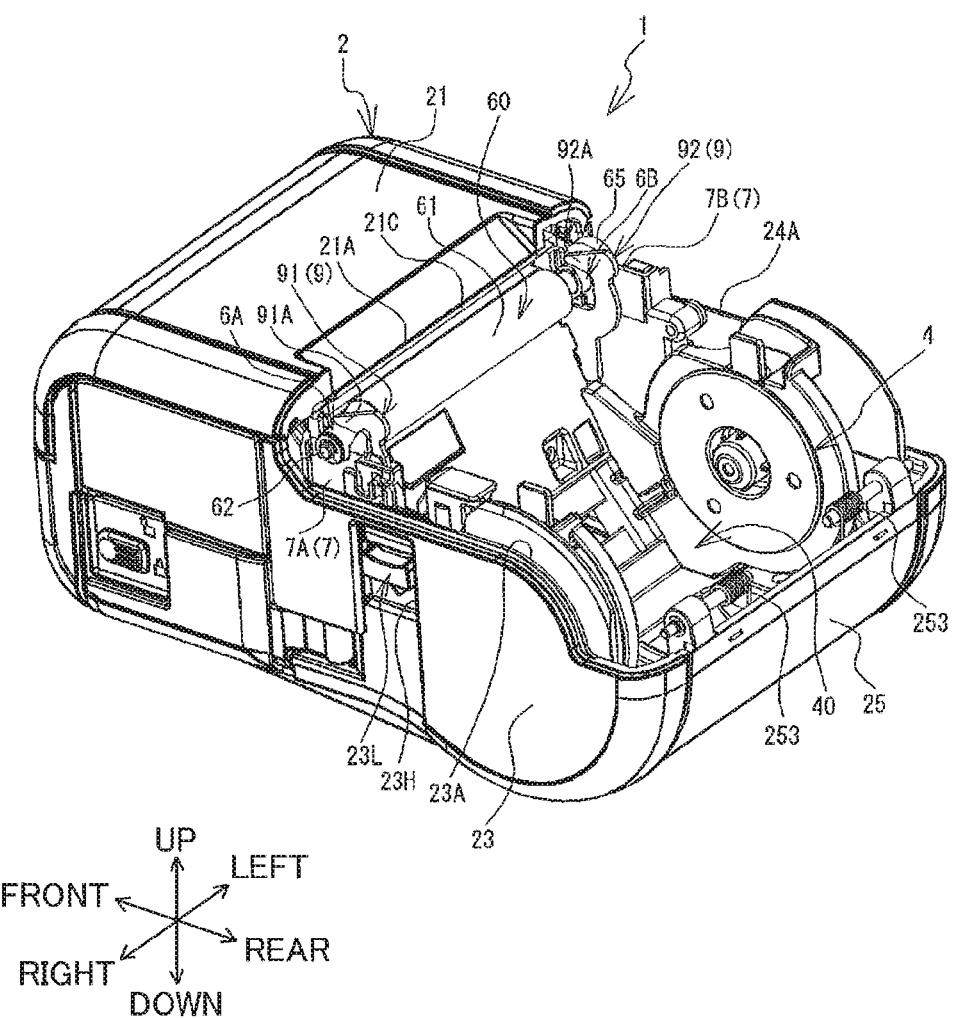
FIG. 7 is a perspective view of the printing device 1 according to the embodiment, and illustrating the platen roller 60 and the bearing 6 in a state where the second cover 3 at its closed position is omitted.

As illustrated in FIG. 7, the platen roller 60 faces the thermal head 21P provided at the inner wall portion 27 (see FIG. 3) when the second cover 3 is in the closed position. The platen 61 presses the printing medium against the thermal head 21P in a state where the printing medium is positioned between the platen 61 and the thermal head 21P. When the motor (not illustrated) is rotated, the gear 65 is also rotated. At this time, the platen 61 is rotated in association with the rotation of the gear 65. With this rotation, the platen 61 is configured to convey the printing medium toward the discharge opening 20 while the platen 61 presses the printing medium against the thermal head 21P.

As illustrated in FIG. 4, the bearing 6A is engaged with the recessed portion 71A of the support portion 7A from above. The protruding portion 91A of the restriction member 91 at its restricting state is in contact with the bearing 6A from above. As illustrated in FIG. 7, the bearing 6B is engaged with the recessed portion 72A (see FIG. 3) of the support portion 7B from above. The protruding portion 92A of the restriction member 92 at its restricting state is in contact with the bearing 6B from above. Accordingly, the restriction mechanism 9 prevents the platen roller 60 from moving upward. The restriction mechanism 9 can maintain the second cover 3 in its closed position, and prevent the second cover 3 from pivotally moving toward the open position due to the biasing force of the springs 253.

When the lever 23L (see FIG. 1) is moved downward while the second cover 3 is in the closed position, each of the restriction members 91 and 92 is moved to the non-restricting state. In this way, the protruding portion 91A of the restriction member 91 is positioned rearward of the recessed portion 71A of the support portion 7, and the protruding portion 92A of the restriction member 92 is positioned rearward of the recessed portion 72A. Thus, upward movement of the bearing 6 is no longer restricted by the restriction mechanism 9. The second cover 3 is pivotally moved in the clockwise direction by the biasing force of the springs 253, so that the second cover 3 is moved to the open position (see FIG. 2).

[Function and Effect in the Embodiment]

In case of dropping the printing device 1, an external force directing toward the opening portion 871, i.e., in a direction Y11 (see FIG. 6) may be applied to the bearing 6 fitted with the fitting portion 8. For example, when the printing device 1 is dropped down while the rear wall 25 faces downward, the external force directing in the direction Y11 is applied to the bearing 6 because the movement of the bearing 6 in a direction away from the opening portion 871 is prevented by the restriction members 91 and 92.

In this case, the pair of abutment portions 67 of the bearing 6 is brought into abutment with the pair of engagement portions 87 to press the pair of engagement portions 87 in the direction Y1. Accordingly, the pair of engagement portions 87 is deformed in a direction Y12 (see FIG. 6) to reduce an area of the opening portion 871. In accordance with the reduction in the area of the opening portion 871, the bearing 6 is engaged with the pair of engagement portions 87 to be immovable. That is, by virtue of the deformation of the pair of engagement portions 87, the printing device 1 can restrain movement of the bearing 6 in the direction Y11. Accordingly, in the printing device 1, disengagement of the bearing 6 from the fitting portion 8 through the opening portion 871 due to the application of external force to the bearing 6 can be restrained by the deformation of the pair of engagement portions 87.

The pair of engagement portions 87 has the sloped surfaces 872A and 872B. The sloped surfaces 672A and 672B of the pair of abutment portions 67 are brought into abutment with the sloped surfaces 872A and 872B, respectively, when the external force directing the direction Y11 is applied to the bearing 6. Here, the sloped surfaces 872A and 872B are sloped toward the inner space of the receiving portion 86 with approaching the opening portion 871. Thus, the pair of engagement portions 87 can be easily deformed in the direction Y12 which is the direction for reducing the dimension of the opening portion 871. Accordingly, in the printing device 1, disengagement the bearing 6 from the fitting portion 8 due to the application of external force to the bearing 6 can be effectively restrained by the appropriate reduction in the area of the opening portion 871 due to the deformation of the engagement portions 87.

The engagement portions 87A and 87B are positioned symmetrically to each other in the upward/downward direction with respect to the imaginary plane V. Similarly, the abutment portions 67A and 67B are positioned symmetrically to each other in the upward/downward direction with respect to the imaginary plane V. With this structure, the pair of abutment portions 67 is brought into abutment with the pair of engagement portions 87 at positions above and below the imaginary plane V. Further, in a case where the pair of abutment portions 67 is brought into abutment with the pair of engagement portions 87, each of the pair of engagement portions 87 is uniformly deformed at the positions above and below the imaginary plane V. Accordingly, disengagement the bearing 6 from the fitting portion 8 due to the application of external force to the bearing 6 in the direction Y11 can be efficiently restrained by the uniform reduction in the gap length of the opening portion 871 in the upward/downward direction at positions above and below the imaginary plane V.

When the platen roller 60 is assembled to the holder 80, the rotational shaft 62 is inserted through the opening portion 871 of the fitting portion 8 and is positioned at the inner space of the receiving portion 86 of the fitting portion 8. Here, the gap length L of the opening portion 871 in the upward/downward direction is greater than the outer diameter L2 of the rotational shaft 62. Therefore, the rotational shaft 62 can be easily inserted into the inner space of the receiving portion 86 through the opening portion 871. Further, the bearing 6 can be easily assembled to the rotational shaft 62 positioned at the inner space of the receiving portion 86.

In a state where the bearing 6 is fitted into the fitting portion 8, the gaps are formed between the second inner wall surface 862 of the receiving portion 86 and the second outer peripheral surface 662 of the bearing 6, and between the second inner wall surface 863 of the receiving portion 86 and the second outer peripheral surface 663 of the bearing 6. The pair of engagement portions 87 can be easily deformed in the direction Y12 (FIG. 6) causing reduction in the area of the opening portion 871 because of the formed gaps. Specifically, the gaps can prevent the inner wall surfaces 862 and 863 from being in abutment with the second outer peripheral surfaces 662 and 663, even if the inner wall surfaces 862 and 863 are deformed inward in accordance with the deformation of the pair of engagement portions 87. That is, inward deformation of the inner wall surfaces 862 and 863 is not prevented by the second outer peripheral surfaces 662 and 663. Accordingly, disengagement of the bearing 6 from the fitting portion 8 through the opening portion 871 can be efficiently restrained through the straightforward deformation of the pair of engagement portions 87.

[First Modification]

Figure 8:
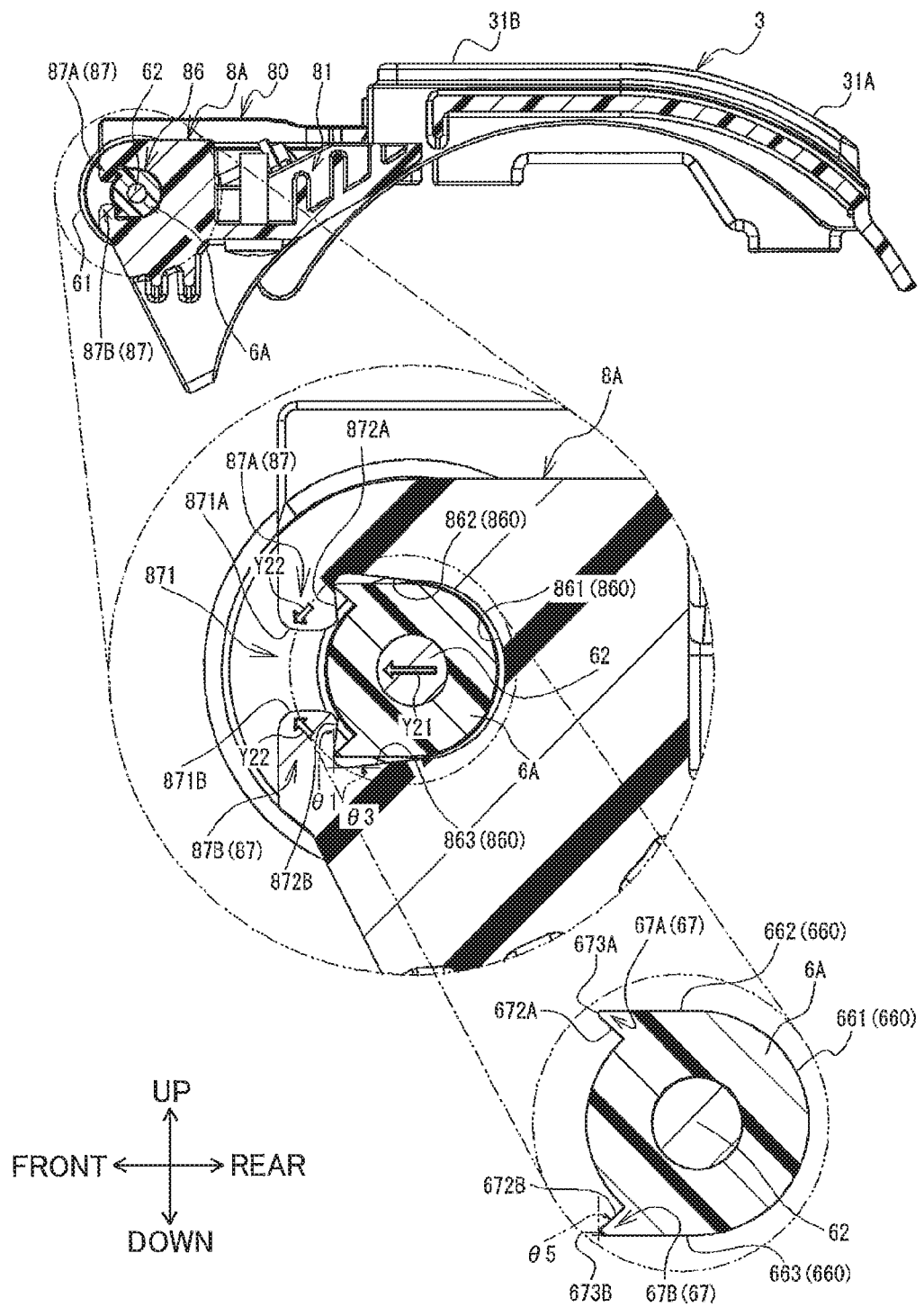
FIG. 8 illustrates a cross-sectional view taken along a line corresponding to the line B-B in FIG. 1 as viewed in the direction shown by the arrow, according to a first modification of the embodiment, and illustrating a partial enlarged view of a portion of the cross-sectional view.

Various modifications may be conceivable. FIG. 8 illustrates a first modification of the embodiment in which an angle of each of the sloped surfaces 672A and 672B of the pair of abutment portions 67 relative to the upward/downward direction differs from the corresponding angle according to the above-described embodiment. In the drawings and the following description, like parts and components having the same functions as those in the embodiment are designated with the same reference numerals to avoid duplicating description.

As illustrated in FIG. 8, the angle of each of the sloped surfaces 672A and 672B relative to the upward/downward direction as viewed from the right side of the bearing 6A will be referred to as a "fifth angle θ5". In FIG. 8, only the fifth angle θ5 of the sloped surface 672B relative to the upward/downward direction is illustrated, and the fifth angle θ5 of the sloped surfaces 672A relative to the upward/downward direction is omitted.

The fifth angle θ5 is greater than the first angle θ1 of each of the sloped surfaces 872A and 872B relative to the upward/downward direction. Therefore, in a state where the bearing 6 is fitted into the receiving portion 86 of the fitting portion 8, intimate contact between the sloped surface 872A and the sloped surface 672A, and between the sloped surface 872B and the sloped surface 672B does not occur but gaps are formed therebetween. Hereinafter, a connecting portion between the second outer peripheral surface 662 and the sloped surface 672A in the abutment portion 67A will be referred to as a "protruding end portion 673A", and a connecting portion between the second outer peripheral surface 663 and the sloped surface 672B in the abutment portion 67B will be referred to as a "protruding end portion 673B".

In a case where the printing device 1 is dropped and an external force directing toward the opening portion 871 (a direction Y21) is applied to the bearing 6, the protruding end portion 673A of the abutment portion 67A is brought into abutment with an upper end portion of the sloped surface 872A of the engagement portion 87A, and the protruding end portion 673B of the abutment portion 67B is brought into abutment with a lower end portion of the sloped surface 872B of the engagement portion 87B. Thus, the protruding end portions 673A and 673B of the pair of abutment portions 67 press the sloped surfaces 872A and 872B of the pair of engagement portions 87, respectively. That is, unlike the above-described embodiment, a pressing force of the pair of abutment portions 67 against the pair of engagement portions 87 can be concentrated on portions at which the protruding end portions 673A and 673B are in contact with the sloped surfaces 872A and 872B. Accordingly, the pair of engagement portions 87 can be easily deformed in a direction Y22 reducing the area of the opening portion 871. Consequently, in the printing device 1, disengagement of the bearing 6 from the fitting portion 8 caused by the application of external force to the bearing 6 can be efficiently restrained by the deformation of the pair of engagement portions 87.

[Second Modification]

Figure 9:
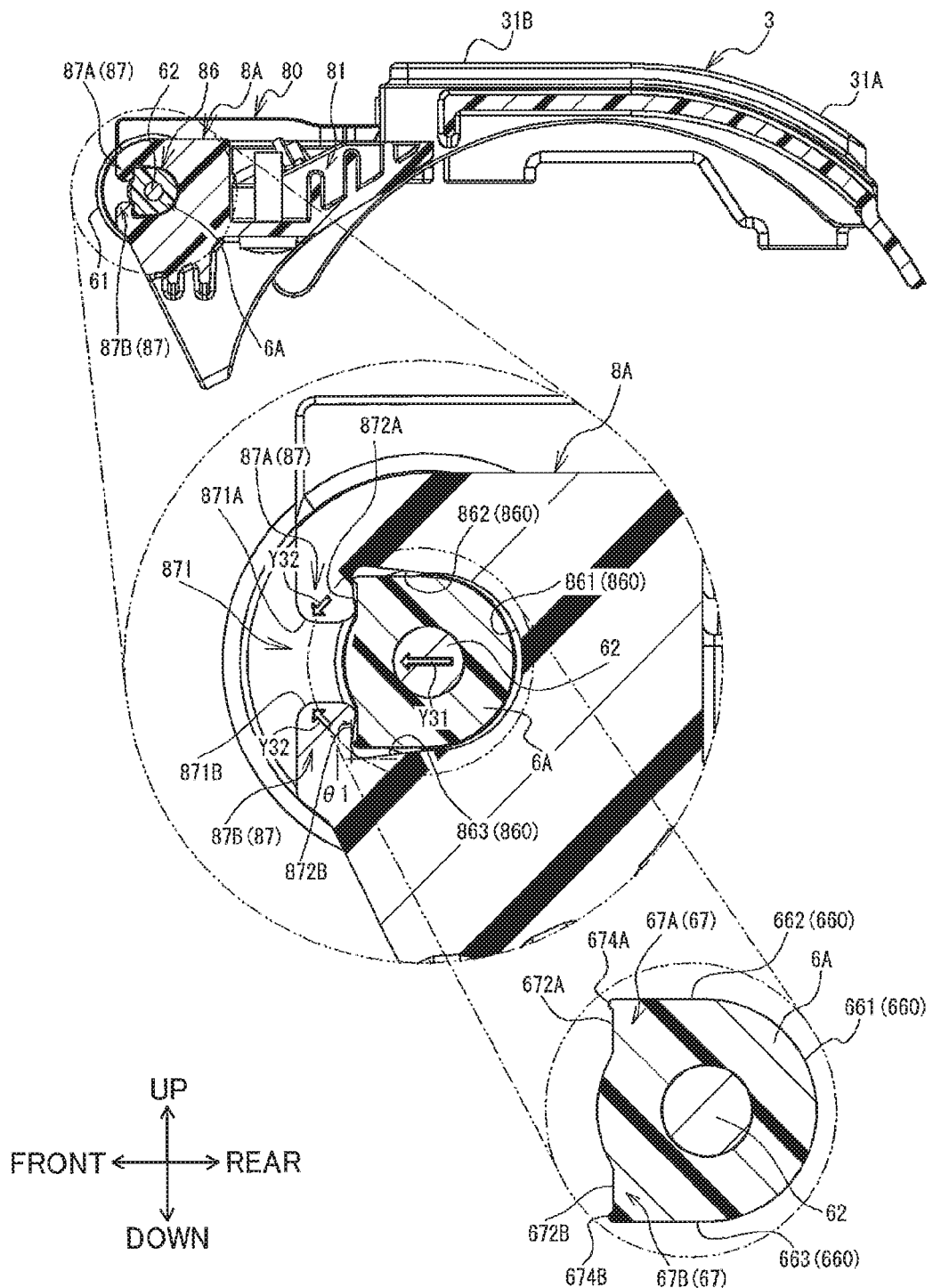
FIG. 9 illustrates a cross-sectional view taken along a line corresponding to the line B-B in FIG. 1 as viewed in the direction shown by the arrow, according to a second modification of the embodiment, and illustrating a partial enlarged view of a portion of the cross-sectional view.

FIG. 9 illustrates a second modification of the embodiment in which an angle of each of the sloped surfaces 672A and 672B of the pair of abutment portions 67 of the bearing 6 relative to the upward/downward direction differs from the corresponding angle according to the above-described embodiment. Further, shapes of an upper end portion of the abutment portion 67A and a lower end portion of the abutment portion 67B differ from the corresponding shapes according to the above-described embodiment. In the drawings and the following description, like parts and components having the same functions as those in the embodiment are designated with the same reference numerals to avoid duplicating description.

As illustrated in FIG. 9, each of the sloped surfaces 672A and 672B extend in a direction approximately parallel to the upward/downward direction as viewed from the right side of the bearing 6. Therefore, the angle of each of the sloped surfaces 672A and 672B relative to the upward/downward direction is smaller than the first angle θ1 of each of the sloped surfaces 872A and 872B of the pair of engagement portions 87 relative to the upward/downward direction. Further, a protruding portion 674A protrudes frontward from an upper end of the sloped surface 672A of the abutment portion 67A, and a protruding portion 674B protrudes frontward from a lower end of the sloped surface 672B of the abutment portion 67B as viewed from the right side of the bearing 6. Intimate contact between the sloped surface 872A and the sloped surface 672A, and between the sloped surface 872B and the sloped surface 672B does not occur but gaps are formed therebetween in the state where the bearing 6 is fitted into the receiving portion 86 of the fitting portion 8.

In a case where the printing device 1 is dropped and an external force directing toward the opening portion 871 (a direction Y31) is applied to the bearing 6, the protruding portion 674A of the abutment portion 67A is brought into abutment with an upper end portion of the sloped surface 872A of the engagement portion 87A, and the protruding portion 674B of the abutment portion 67B is brought into abutment with a lower end portion of the sloped surface 872B of the engagement portion 87B. Thus, the protruding portions 674A and 674B press the sloped surfaces 872A and 872B, respectively. That is, similar to the first modification, a pressing force of the pair of abutment portions 67 against the pair of engagement portions 87 can be concentrated on portions at which the protruding portions 674A and 674B are in contact with the sloped surfaces 872A and 872B. Accordingly, the pair of engagement portions 87 can be easily deformed in a direction Y32 reducing the dimension of the opening portion 871. Consequently, in the printing device 1, disengagement of the bearing 6 from the fitting portion 8 caused by the application of external force to the bearing 6 can be efficiently restrained by the deformation of the pair of engagement portions 87.

[Third Modification]

Figure 10:
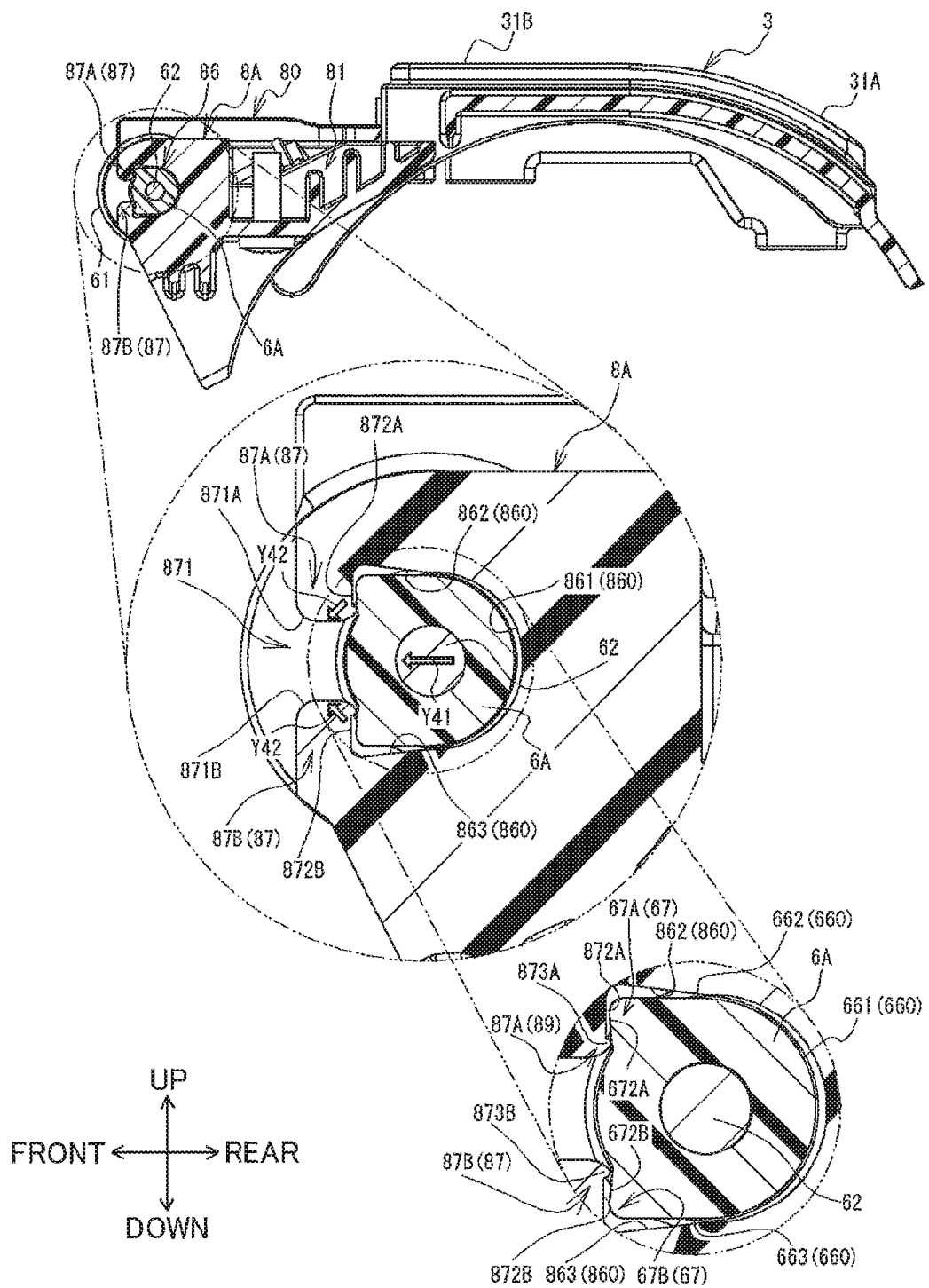
FIG. 10 illustrates a cross-sectional view taken along a line corresponding to the line B-B in FIG. 1 as viewed in the direction shown by the arrow, according to a third modification of the embodiment, and illustrating a partial enlarged view of a portion of the cross-sectional view.

FIG. 10 illustrates a third modification of the embodiment in which shapes of a lower end portion of the engagement portion 87A and an upper end portion of the engagement portion 87B of the receiving portion differ from the corresponding shapes according to the above-described embodiment. In the drawings and the following description, like parts and components having the same functions as those in the embodiment are designated with the same reference numerals to avoid duplicating description.

As illustrated in FIG. 10, a protruding portion 873A protrudes rearward from a lower end portion of the sloped surface 872A of the engagement portion 87A, and a protruding portion 873B protrudes rearward from an upper end portion of the sloped surface 872B of the engagement portion 87B as viewed from the right side of the bearing 6A. Intimate contact between the sloped surface 872A and the sloped surface 672A, and between the sloped surface 872B and the sloped surface 672B does not occur but gaps are formed therebetween in the state where the bearing 6 is fitted with the receiving portion 86 of the fitting portion 8.

In a case where the printing device 1 is dropped and an external force directing toward the opening portion 871 (a direction Y41) is applied to the bearing 6, the protruding portion 873A of the engagement portion 87A is brought into abutment with a lower end portion of the sloped surface 672A of the abutment portion 67A, and the protruding portion 873B of the engagement portion 87B is brought into abutment with an upper end portion of the sloped surface 672B of the abutment portion 67B. Thus, portions of the pair of abutment portions 67 in abutment with the protruding portions 873A and 873B press the protruding portions 873A and 873B of the pair of engagement portions 87, respectively. That is, in the third modification, a pressing force of the pair of abutment portions 67 against the pair of engagement portions 87 can be concentrated on the protruding portions 873A and 873B. Accordingly, the pair of engagement portions 87 can be easily deformed in a direction Y42 reducing the area of the opening portion 871. Consequently, in the printing device 1, disengagement of the bearing 6 from the fitting portion 8 caused by the application of external force to the bearing 6 can be efficiently restrained by the deformation of the pair of engagement portions 87.

[Other Modifications]

Further modifications may be conceivable. For example, the first angle θ1 of the sloped surfaces 872A and 872B is approximately equal to the second angle θ2 of the sloped surfaces 672A and 672B. However, the angles θ1 and θ2 may be different from each other. One of the first angle θ1 and the second angle θ2 may be slightly greater than or smaller than the remaining one of the first angle θ1 and the second angle θ2. Further, the sloped surfaces 872A and 872B may not be sloped toward the inner space of the receiving portion 86 with approaching the opening portion 871. For example, the sloped surfaces 872A and 872B may be sloped outward of the receiving portion 86 with approaching the opening portion 871. Alternatively, each of the sloped surfaces 872A and 872B may extend parallel to the upward/downward direction, for example.

Further, the pair of engagement portions 87 (engagement portions 87A and 87B) may have a shape asymmetrical to each other with respect to the imaginary plane V in the upward/downward direction. Similarly, the pair of abutment portions 67 (abutment portions 67A and 67B) may have a shape asymmetrical to each other with respect to the imaginary plane V in the upward/downward direction. Further, only one of the engagement portions 87A and 87B may be provided in the fitting portion 8. Further, only the abutment portion 67A may be provided in the bearing 6 if only the engagement portion 87A is provided in the fitting portion 8. On the other hand, only the abutment portion 67B may be provided in the bearing 6 if only the engagement portion 87B is provided in the fitting portion 8.

The outer diameter L2 of the rotational shaft 62 may be approximately equal to the gap length L1 in the upward/downward direction of the opening portion 871. Alternatively, the outer diameter L2 of the rotational shaft 62 may be slightly greater than the gap length L1. In the latter case, the opening portion 871 may be expanded such that the gap distance L1 becomes greater than the outer diameter L2 by the application of the force from the rotational shaft 62 during insertion of the rotational shaft 62 into the receiving portion 86 through the opening portion 871.

While the description has been made in detail with reference to the specific embodiments, it would be apparent to those skilled in the art that various changes and modifications may be made therein.

What is claimed is:

1. A printing device comprising:
   a platen roller having a rotational shaft extending in a first direction, the rotational shaft having end portions in the first direction;
   a pair of bearings each rotatably supporting each end portion of the rotational shaft in the first direction, each of the pair of bearings being formed with a through-hole through which the rotational shaft extends to form a generally hollow cylindrical shape, the through-hole defining a center axis extending in the first direction, each of the pair of bearings having a generally D-shape as viewed in the first direction, each of the pair of bearings including an abutment portion at a part of an outer peripheral surface; and
   a holder including a pair of fitting portions, each of the pair of bearings being fitted into each of the pair of fitting portions, each of the pair of fitting portions comprising:
      a receiving portion having a substantially U-shape as viewed in the first direction, the receiving portion having an inner space configured to receive the corresponding bearing such that the outer peripheral surface of the bearing is fitted into the receiving portion;
      an opening portion in communication with the inner space of the receiving portion; and
      an engagement portion extending from the receiving portion to define a gap serving as the opening portion, the abutment portion being configured to abut against the engagement portion, the engagement portion being configured to be deformed so as to reduce an area of the opening portion in response to application of a pressing force from the abutment portion to the engagement portion due to application of an external force to the bearing in a direction toward the opening portion, whereby the engagement portion immovably engages the bearing.

2. The printing device according to claim 1, wherein the engagement portion has a sloped surface sloped toward the inner space of the receiving portion as extending toward the opening portion, and wherein the abutment portion has a sloped surface configured to contact the sloped surface of the engagement portion.

3. The printing device according to claim 1, wherein the opening portion has a center point to define an imaginary plane parallel to the first direction and passing through the center axis, wherein the engagement portion includes a first engagement portion and a second engagement portion, the first engagement portion and the second engagement portion being positioned symmetrically to each other with respect to the imaginary plane, and wherein the abutment portion includes a first abutment portion and a second abutment portion, the first abutment portion and the second abutment portion being positioned symmetrically to each other with respect to the imaginary plane.

4. The printing device according to claim 1, wherein the abutment portion includes a protruding portion protruding toward the engagement portion, and wherein the engagement portion has a sloped surface configured to contact the protruding portion.

5. The printing device according to claim 3, wherein each of the first engagement portion and a second engagement portion has a tip end, the tip ends facing each other to define the gap serving as the opening portion therebetween, each of the first engagement portion and the second engagement portion being configured to be deformed so as to reduce the area of the opening portion upon application of the external force to the corresponding bearing.

6. The printing device according to claim 1, wherein the engagement portion has a protruding portion protruding toward the abutment portion, and wherein the abutment portion has a sloped surface configured to contact the protruding portion.

7. The printing device according to claim 1, wherein the opening portion has a gap length greater than an outer diameter of the rotational shaft.

* * * * *